(12) United States Patent
Li et al.

(10) Patent No.: US 11,647,322 B2
(45) Date of Patent: May 9, 2023

(54) TWS EARPHONE COMMUNICATION METHOD AND SYSTEM FOR TWS EARPHONES

(71) Applicants: VeriSilicon Microelectronics (Shanghai) Co., Ltd., Shanghai (CN); VeriSilicon Holdings Co., Ltd., Cayman Islands (KY)

(72) Inventors: Shuai Li, Shanghai (CN); Maogang Li, Shanghai (CN)

(73) Assignees: VeriSilicon Microelectronics (Shanghai) Co., Ltd., Pudong New Area (CN); VeriSilicon Holdings Co., Ltd., Grand Cayman (KY)

( * ) Notice: Subject to any disclaimer, the term of this patent is extended or adjusted under 35 U.S.C. 154(b) by 141 days.

(21) Appl. No.: 17/355,124

(22) Filed: Jun. 22, 2021

(65) Prior Publication Data

US 2021/0400374 A1 Dec. 23, 2021

(30) Foreign Application Priority Data

Jun. 22, 2020 (CN) .......................... 202010573192.0

(51) Int. Cl.
H04R 1/10 (2006.01)
H04W 76/14 (2018.01)
H04L 1/18 (2023.01)

(52) U.S. Cl.
CPC ............. H04R 1/1091 (2013.01); H04L 1/18 (2013.01); H04W 76/14 (2018.02); *H04R 2420/07* (2013.01)

(58) Field of Classification Search
CPC .. H04R 1/1033; H04R 1/1041; H04R 1/1091; H04R 1/1066; H04R 2201/10; H04R 2420/03; H04R 2420/05; H04R 2420/09
See application file for complete search history.

(56) References Cited

U.S. PATENT DOCUMENTS 10,244,307 B1 * 3/2019 Tong .................... H04R 1/1091

* cited by examiner

*Primary Examiner* — Kile O Blair

(57) ABSTRACT

The present disclosure provides a TWS earphone communication method and system, and TWS earphones. The method includes: when an audio source sends a data packet and a main earphone correctly receives the data packet, the main earphone sends acknowledgment information in an acknowledgment information slot; when the data packet is incorrectly received by the main earphone, no information is sent in the acknowledgment information slot; and when the data packet is received correctly by a secondary earphone, the secondary earphone does not send any information in the acknowledgment information slot. When the data packet is not received correctly by the secondary earphone, it sends interference information in the acknowledgment information slot.

10 Claims, 3 Drawing Sheets

When the audio source sends a data packet, if the main earphone and the secondary earphone both correctly receive the data packet, the main earphone sends acknowledgment information in an acknowledgment information slot and the secondary earphone does not send any information so that the audio source continues to send new data packets — S1

When the audio source sends a data packet, if the secondary earphone correctly receives the data packet and the main earphone does not receive the data packet correctly, no information is sent by either the main earphone or the secondary earphone in the acknowledgment information slot, so that the audio source resends the data packet — S2

When the audio source sends a data packet, if the main earphone correctly receives the data packet and the secondary earphone does not receive the data packet correctly, in the acknowledgment information slot, acknowledgment information is sent by the main earphone, and interference information is sent by the secondary earphone, so that the audio source resends the data packet — S3

When the audio source sends a data packet, if neither the main earphone nor the secondary earphone correctly receives the data packet, the main earphone does not send any information and the secondary earphone sends interference information in the acknowledgment information slot, so that the audio source resends the data packet — S4

TWS EARPHONE COMMUNICATION METHOD AND SYSTEM FOR TWS EARPHONES

CROSS REFERENCE TO RELATED APPLICATION

The present application claims the benefit of priority to Chinese Patent Application No. CN 2020105731920, entitled "TWS EARPHONE COMMUNICATION METHOD AND SYSTEM, AND TWS EARPHONES", filed with CNIPA on Jun. 22, 2020, the disclosure of which is incorporated herein by reference in its entirety.

FIELD OF TECHNOLOGY

The present disclosure relates to wireless earphones, in particular to a true wireless stereo (TWS) earphone communication method and system, and TWS earphones.

BACKGROUND

With the development of Bluetooth technology and the widespread use of Bluetooth products, Bluetooth wireless earphones are becoming a necessity for everyday life. Because TWS earphones are easy to carry and wear, they are getting more and more popular. For TWS earphones, the design difficulty lies in how the left and right earphones can receive Bluetooth signals at the same time, and how to maintain synchronization.

In the prior art, a Bluetooth connection is usually established between the main earphone and an audio source such as a mobile phone, the secondary earphone does not establish a Bluetooth connection with the audio source, and at the same time, a connection (Bluetooth connection or non-Bluetooth connection) is also established between the main earphone and the secondary earphone. After the main earphone receives audio data, it forwards the audio data to the secondary earphone. However, in this method, the power consumption of main earphone is significantly higher than the secondary earphone, and there is a large latency, while excessive bandwidth is consumed.

SUMMARY

The present invention provides a TWS earphone communication method and system, and TWS earphones, which are capable of ensuring that the main and secondary earphones receive the same data packets without information interaction between them.

The method includes: When the audio source sends a data packet, if the main earphone and the secondary earphone both correctly receive the data packet, sending acknowledgment information by the main earphone in an acknowledgment information slot, wherein the secondary earphone does not send any information, so that the audio source continues sending new data packets; when the audio source sends a data packet, if the secondary earphone correctly receives the data packet and the main earphone does not receive the data packet correctly, sending no information by either the main earphone or the secondary earphone in the acknowledgment information slot, so that the audio source resends the data packet; when the audio source sends a data packet, if the main earphone correctly receives the data packet and the secondary earphone does not receive the data packet correctly, in the acknowledgment information slot, sending acknowledgment information by the main earphone, and sending interference information by the secondary earphone, so that the audio source resends the data packet; and when the audio source sends a data packet, if neither the main earphone nor the secondary earphone receives the data packet correctly, in the acknowledgment information slot, sending no information by the main earphone, and sending interference information by the secondary earphone, so that the audio source resends the data packet.

In one embodiment of the present disclosure, the interference information and the acknowledgment information use signals of the same frequency.

In one embodiment of the present disclosure, the method further includes: the main earphone acquiring Bluetooth parameters for establishing a Bluetooth connection with the audio source, and subsequently receiving data packets sent by the audio source based on the Bluetooth parameters; the secondary earphone obtaining the Bluetooth parameters from the main earphone, in order to subsequently receive data packets sent by the audio source based on the Bluetooth parameters.

The present disclosure provides TWS earphones, which include a main earphone and a secondary earphone.

When the audio source sends a data packet, the main earphone sends acknowledgment information in an acknowledgment information slot when the data packet is correctly received, and the main earphone does not send any information in the acknowledgment information slot when the data packet is not received correctly.

When the audio source sends a data packet, the secondary earphone does not send any information in the acknowledgment information slot when the data packet is received correctly, and the secondary earphone sends interference information in the acknowledgment information slot when the data packet is not received correctly.

In one embodiment of the present disclosure, the interference information and the acknowledgment information use signals of the same frequency.

In one embodiment of the present disclosure, the main earphone is also used to establish a Bluetooth connection with the audio source, and obtain Bluetooth parameters for receiving data packets sent by the audio source based on the Bluetooth parameters; the secondary earphone is also used to obtain the Bluetooth parameters from the main earphone to receive the data packets sent by the audio source based on the Bluetooth parameters.

In one embodiment of the present disclosure, the communication between the main earphone and the secondary earphone is based on a Bluetooth protocol.

In one embodiment of the present disclosure, the communication between the main earphone and the secondary earphone is based on a non-Bluetooth protocol.

The present disclosure provides a TWS earphone communication system, including the above-mentioned TWS earphones and audio source. The audio source is configured to transmit a data packet, and to continue to send new packets when acknowledgment information is received, and to resend the data packet when the acknowledgment information is not received.

In one embodiment, the audio source includes one or more of a smart phone, a smart speaker, an IPAD, and a personal computer.

As mentioned above, the TWS earphone communication method and system, and TWS earphones of the present disclosure have the following beneficial effects:

(1) The main and secondary earphones can receive the same data packets without information interaction between them, which ensures synchronization of data reception and reducing the complexity of implementing information interaction between the main and secondary earphones.

(2) There is no need to forward audio data by either earphone, thereby saving power consumption and bandwidth, and lowering requirements for RF RX/TX conversion.

REFERENCE NUMERALS

61 Main earphone
62 Secondary Earphone
71 TWS earphones
72 Audio Source

DETAILED DESCRIPTION

The following describes the implementation of the present disclosure through specific examples, and those skilled in the art can easily understand other advantages and effects of the present disclosure from the content disclosed in this specification. The present disclosure can also be implemented or applied through other different specific embodiments. Various details in this specification can also be modified or changed based on different viewpoints and applications without departing from the spirit of the present disclosure. It should be noted that the following embodiments and the features in the embodiments can be combined with each other if no conflict will result.

It should be noted that the drawings provided in this disclosure only illustrate the basic concept of the present invention in a schematic way, so the drawings only show the components related to the present invention. The drawings are not necessarily drawn according to the number, shape and size of the components in actual implementation; during the actual implementation, the type, quantity and proportion of each component can be changed as needed, and the components' layout may also be more complicated.

The TWS earphone communication method and system, and TWS earphones of the present disclosure, ensure that when an audio source is sending data packets, the main and secondary earphones can receive the same data packets without information interaction between the two, which significantly saves power consumption and bandwidth, thereby improving user experience.

The TWS earphones include a main earphone and a secondary earphone, wherein the main earphone can communicate with an audio source, the secondary earphone can communicate with the main earphone, and the main earphone and the secondary earphone can provide playback of audio data from the audio source.

Figure 1:
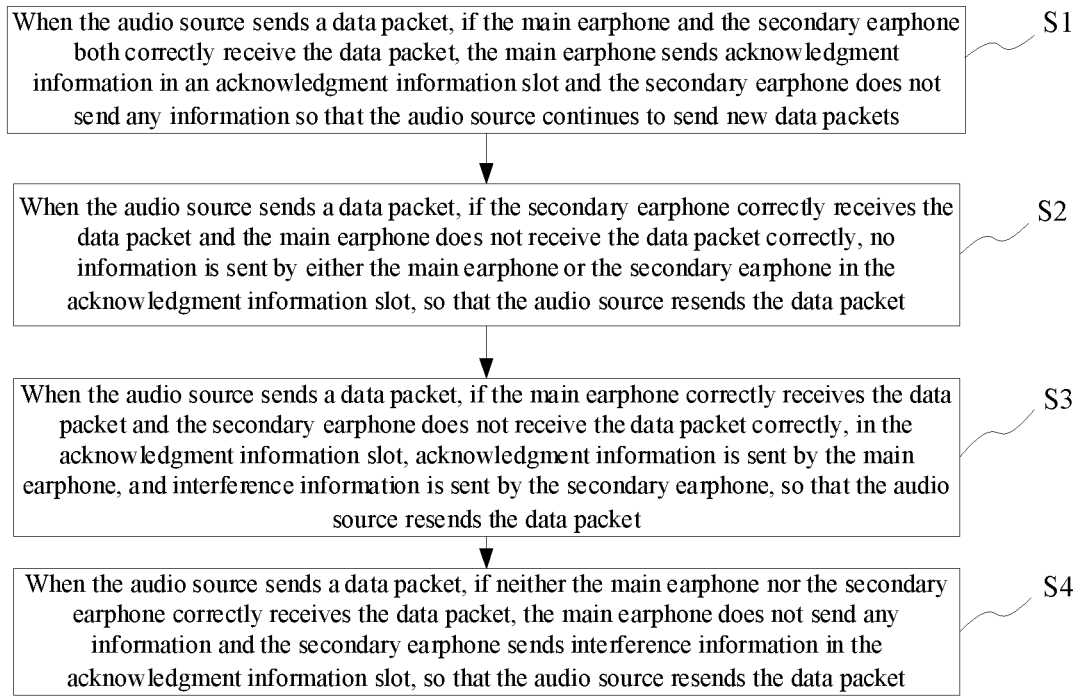
FIG. 1 shows a flowchart of a TWS earphone communication method according to the present disclosure.

As shown in FIG. 1, in an embodiment, the TWS earphone communication method of the present disclosure includes the following steps:

S1. When the audio source sends a data packet, if the main earphone and the secondary earphone both correctly receive the data packet, the main earphone sends acknowledgment information in an acknowledgment information slot and the secondary earphone does not send any information so that the audio source continues to send new data packets.

Figure 2:
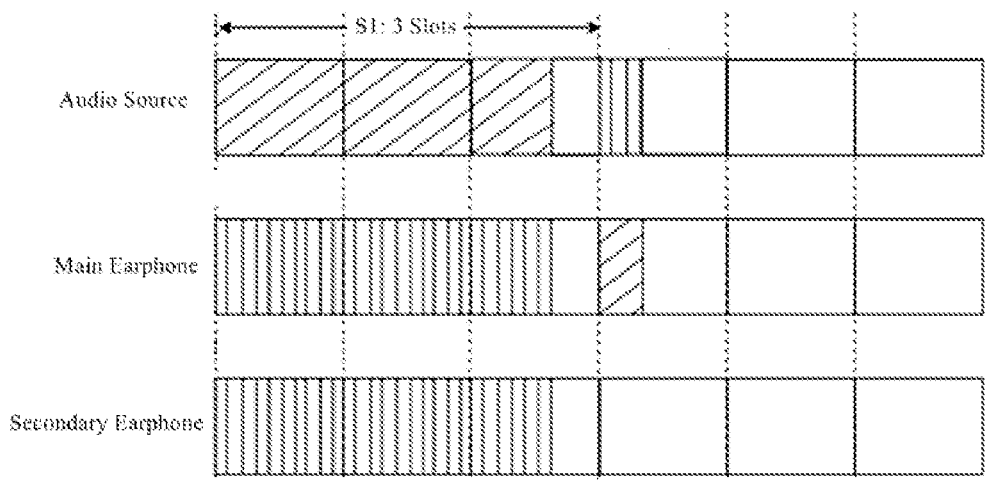
FIG. 2 shows a timing diagram of data packet transmission when a main earphone and secondary earphone both receive data packets correctly.

Specifically, when the TWS earphones are being used, the audio source, such as a smart phone, a smart speaker, an IPAD, and a personal computer, sends data packets in real time for the main earphone and the secondary earphone to receive. As shown in FIG. 2, after a data packet is sent, when the main earphone correctly receives the data packet, the main earphone sends acknowledgment information ACK in the acknowledgment information slot (shown by the lower left diagonal stripe in FIG. 2) to the audio source. When the secondary earphone correctly receives the data packet, no information is sent to the audio source in the acknowledgment information slot. At this time, the audio source only receives the acknowledgment information sent by the main earphone and determines that the main earphone and the secondary earphone receive the data packet correctly (as shown by the vertical stripes in FIG. 2), and then continues to send subsequent packets.

S2. When the audio source sends a data packet, if the secondary earphone correctly receives the data packet and the main earphone does not receive the data packet correctly, no information is sent by either the main earphone or the secondary earphone in the acknowledgment information slot, so that the audio source resends the data packet.

Figure 3:
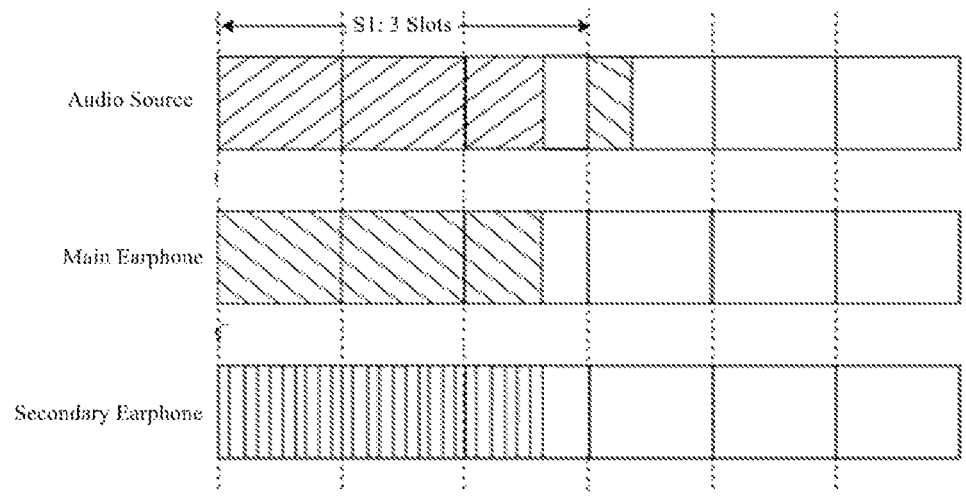
FIG. 3 shows a timing diagram of data packet transmission when a main earphone does not receive a data packet correctly and a secondary earphone receives the data packet correctly.

As shown in FIG. 3, after a data packet is sent, when the main earphone does not receive the data packet correctly, no information is sent by the main earphone to the audio source in the acknowledgment information slot. When the secondary earphone receives the data packet correctly, no information is sent by the secondary earphone to the audio source in the acknowledgment information slot. At this time, the audio source does not receive acknowledgment information from the main earphone and determines that the main earphone has not received the data packet correctly (as shown by the diagonal stripe on the lower right in FIG. 3), and then resends the data packet.

S3. When the audio source sends a data packet, if the main earphone correctly receives the data packet and the secondary earphone does not receive the data packet correctly, in the acknowledgment information slot, acknowledgment information is sent by the main earphone, and interference information is sent by the secondary earphone, so that the audio source resends the data packet.

Figure 4:
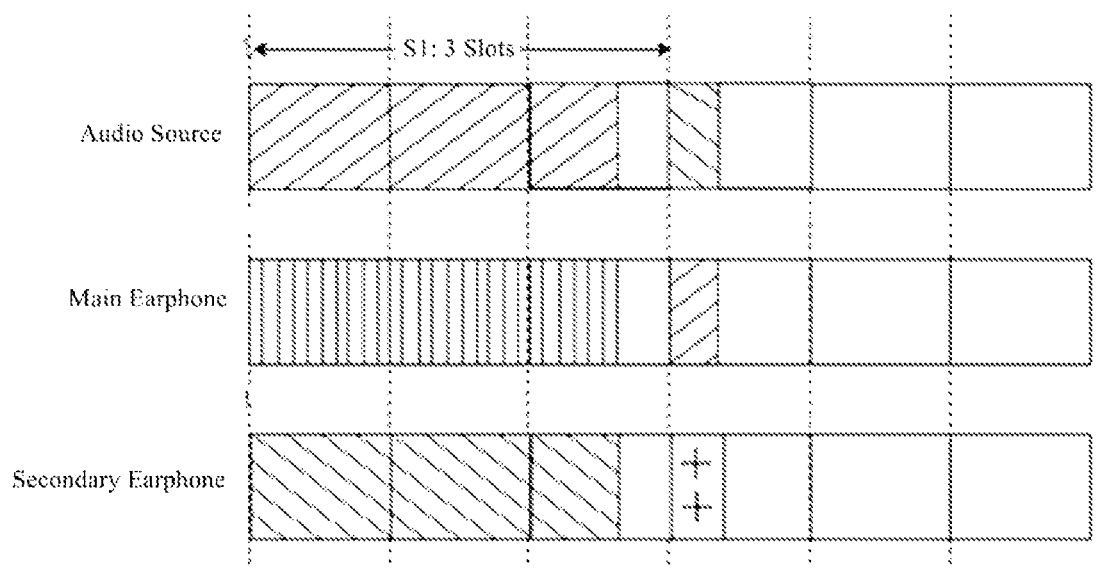
FIG. 4 shows a timing diagram of data packet transmission when a main earphone receives a data packet correctly and a secondary earphone does not receive the data packet correctly.

As shown in FIG. 4, after a data packet is sent, when the main earphone correctly receives the data packet, it sends acknowledgment information ACK in the acknowledgment information slot (shown by the lower left diagonal stripes in FIG. 4) to the audio source. When the secondary earphone does not receive the data packet correctly, it sends interference information NAKI (as shown by the cross pattern in FIG. 4) to the audio source in the acknowledgment information slot. At this time, because the acknowledgment information and the interference information exist in the same slot at the same time, the audio source cannot receive acknowledgment information sent by the main earphone, and it determines that the main earphone has not received the data packet correctly (as shown by the diagonal stripes at the bottom right in FIG. 4), and the data packet is resent by the audio source. Preferably, the interference information and the acknowledgment information use signals of the same frequency to further ensure that the audio source cannot receive the acknowledgment information with the presence of the interference information.

S4: When the audio source sends a data packet, if neither the main earphone nor the secondary earphone correctly receives the data packet, the main earphone does not send any information and the secondary earphone sends interference information in the acknowledgment information slot, so that the audio source resends the data packet.

Figure 5:
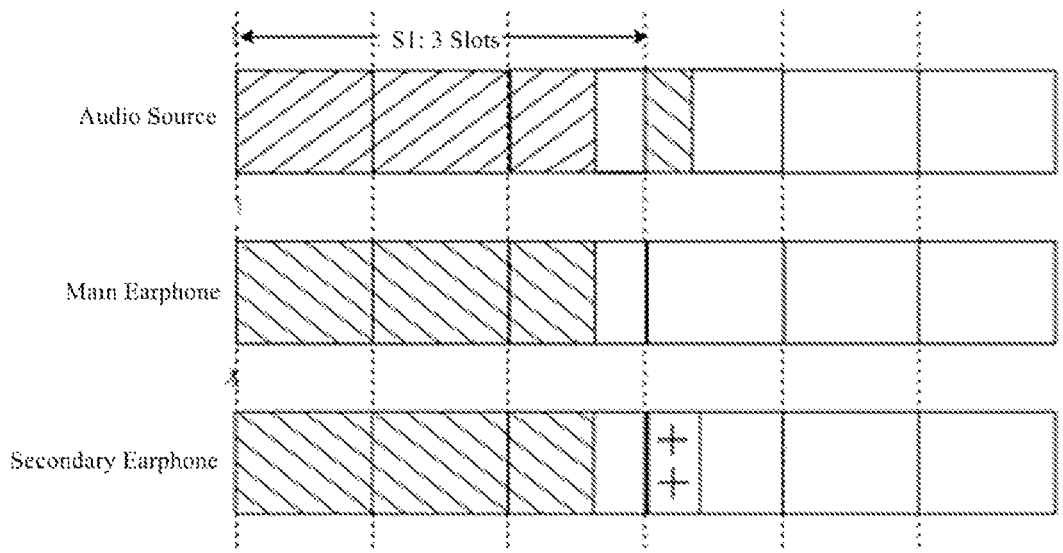
FIG. 5 shows a timing diagram of data packet transmission when neither a main earphone nor a secondary earphone receives a data packet correctly.

As shown in FIG. 5, after a data packet is sent, when the main earphone does not receive the data packet correctly, no information is sent by the main earphone to the audio source in the acknowledgment information slot. When the secondary earphone does not receive the data packet correctly, it sends interference information NAKI (as shown by the cross pattern in FIG. 5) to the audio source in the acknowledgment information slot. At this time, the audio source does not receive acknowledgment information from the main earphone, and it determines that the main earphone has not received the data packet correctly (as shown by the diagonal stripe on the lower right in FIG. 5), and then resends the data packet.

Therefore, through the above method, without interaction between the main and secondary earphones, it can still be ensured that the main earphone and the secondary earphone correctly receive the same data packets.

In one embodiment of the present disclosure, in the TWS earphones communication method of the present disclosure, the main earphone establishes a Bluetooth connection with the audio source, and obtains Bluetooth parameters, and subsequently receives the data packets from the audio source. The main earphone and the secondary earphone are paired with each other and can communicate based on a Bluetooth protocol or a non-Bluetooth protocol. Specifically, the secondary earphone acquires Bluetooth parameters from the main earphone and establishes a Bluetooth connection with the audio source to receive data packets sent by the audio source based on the Bluetooth parameters without the need of the main earphone forwarding the data packets.

Figure 6:
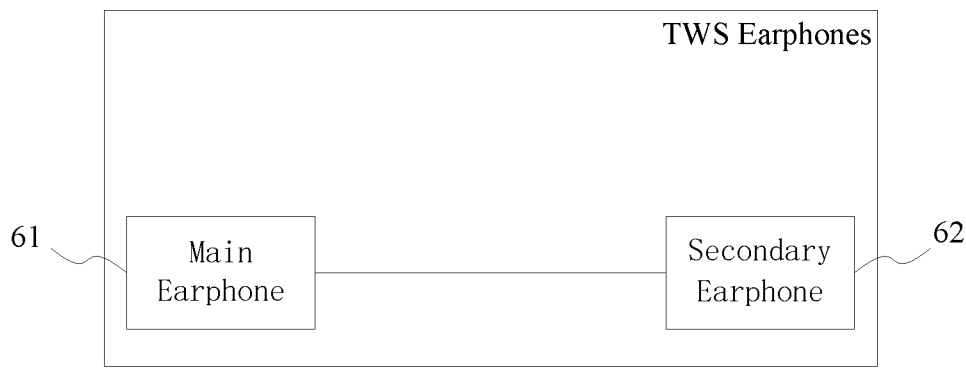
FIG. 6 shows the structure of TWS earphones according to an embodiment of the present disclosure.

As shown in FIG. 6, in one embodiment, the TWS earphones of the present invention include a main earphone 61 and a secondary earphone 62.

When the audio source sends a data packet, the main earphone 61 sends acknowledgment information in an acknowledgment information slot when the data packet is correctly received, and the main earphone does not send any information in the acknowledgment information slot when the data packet is not received correctly;

When the audio source sends a data packet, the secondary earphone 62 does not send any information in the acknowledgment information slot when the data packet is received correctly, and the secondary earphone sends interference information in the acknowledgment information slot when the data packet is not received correctly.

Therefore, only when the main earphone and the secondary earphone receive the data packet correctly will the audio source continue to send a new packet; when at least one of the main earphone and the secondary earphone has unclear reception of the data packet, the audio source needs to resend the data packet to ensure synchronization and consistency of the data communication of the main earphone and the secondary earphone.

In one embodiment of the present disclosure, the main earphone is also used to establish a Bluetooth connection with the audio source, and obtain Bluetooth parameters, and subsequently receive data packets sent by the audio source based on the Bluetooth parameters. The main earphone and the secondary earphone are paired with each other and can communicate based on a Bluetooth protocol or non-Bluetooth protocol. The secondary earphone is also used to obtain the Bluetooth parameters from the main earphone and establish a Bluetooth connection with the audio source to receive data packets sent by the audio source based on the Bluetooth parameters without the need of the main earphone forwarding the data packets to the secondary earphone.

Figure 7:
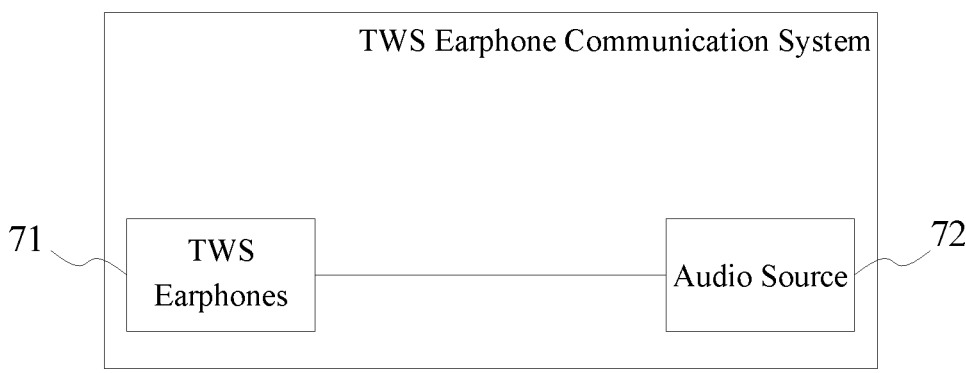
FIG. 7 shows the structure of a TWS earphone communication system according to an embodiment of the present disclosure.

As shown in FIG. 7, in an embodiment, the TWS earphone communication system of the present disclosure includes the above TWS earphones 71 and audio source 72.

The audio source 72 is connected to the TWS earphones 71 via Bluetooth communication, and is configured to transmit a data packet, and to continue to send new packets when acknowledgment information is received, and to resend the data packet when the acknowledgment information is not received.

In one embodiment, the audio source device includes one or more of a smart phone, a smart speaker, an IPAD, and a personal computer.

In summary, the TWS earphone communication method and system, TWS earphones of the present disclosure can ensure that the main and secondary earphones correctly receive the same packet, which ensures the synchronization of data reception, reduces the complexity of implementing the information interaction between the main and secondary earphones; there is no need to forward audio data by either earphone, which saves power and bandwidth, thereby lowering requirements for RF RX/TX conversion. Therefore, the present disclosure effectively overcomes various shortcomings of the prior art and has a high industrial value.

The above-mentioned embodiments only exemplarily illustrate the principles and effects of the present disclosure, and are not used to limit the present disclosure. Anyone familiar with this technology can modify or change the above-mentioned embodiments without departing from the spirit and scope of the present disclosure. Therefore, all equivalent modifications or changes made by those skilled in the art without departing from the spirit and technical concepts disclosed by the present disclosure should still be covered by the attached claims of the present disclosure.

What is claimed is:

1. A TWS earphone communication method, wherein the TWS earphones include a main earphone and a secondary earphone, wherein the method comprises:
   when an audio source sends a data packet, if the main earphone and the secondary earphone both correctly receive the data packet, sending acknowledgment information by the main earphone in an acknowledgment information slot, wherein the secondary earphone does not send any information, so that the audio source continues sending new data packets;
   when the audio source sends a data packet, if the secondary earphone correctly receives the data packet and the main earphone does not receive the data packet correctly, sending no information by either the main earphone or the secondary earphone in the acknowledgment information slot, so that the audio source resends the data packet;

when the audio source sends a data packet, if the main earphone correctly receives the data packet and the secondary earphone does not receive the data packet correctly, in the acknowledgment information slot, sending acknowledgment information by the main earphone, and sending interference information by the secondary earphone, so that the audio source resends the data packet; and when the audio source sends a data packet, if neither the main earphone nor the secondary earphone receives the data packet correctly, in the acknowledgment information slot, sending no information by the main earphone, and sending interference information by the secondary earphone, so that the audio source resends the data packet.

2. The TWS earphone communication method according to claim 1, wherein the interference information and the acknowledgment information use signals of the same frequency.

3. The TWS earphone communication method according to claim 1, wherein the secondary earphone obtains Bluetooth parameters from the main earphone, establishes a Bluetooth connection with the audio source, and subsequently receives data packets sent by the audio source based on the Bluetooth parameters without the need of the main earphone forwarding the data packets to the secondary earphone.

4. TWS earphones, comprising: a main earphone and a secondary earphone, wherein when an audio source sends a data packet, the main earphone sends acknowledgment information in an acknowledgment information slot when the data packet is correctly received by the main earphone, and the main earphone does not send any information in the acknowledgment information slot when the data packet is not received correctly by the main; and wherein when the audio source sends a data packet, the secondary earphone does not send any information in the acknowledgment information slot when the data packet is received correctly by the secondary earphone, and the secondary earphone sends interference information in the acknowledgment information slot when the data packet is not received correctly by the secondary earphone.

5. The TWS earphones according to claim 4, wherein the interference information and the acknowledgment information use signals of the same frequency.

6. The TWS earphones according to claim 4, wherein the secondary earphone obtains Bluetooth parameters from the main earphone, establishes a Bluetooth connection with the audio source, and subsequently receives data packets sent by the audio source based on the Bluetooth parameters without the need of the main earphone forwarding the data packets to the secondary earphone.

7. The TWS earphones according to claim 6, wherein the communication between the main earphone and the secondary earphone is based on a Bluetooth protocol.

8. The TWS earphones of claim 6, wherein the main earphone and the secondary earphone communicate based on a non-Bluetooth protocol.

9. A TWS earphones communication system, comprising TWS earphones and audio source, wherein the TWS earphones comprise a main earphone and a secondary earphone, wherein when an audio source sends a data packet, the main earphone sends acknowledgment information in an acknowledgment information slot when the data packet is correctly received by the main earphone, and the main earphone does not send any information in the acknowledgment information slot when the data packet is not received correctly by the main;

wherein when the audio source sends a data packet, the secondary earphone does not send any information in the acknowledgment information slot when the data packet is received correctly by the secondary earphone, and the secondary earphone sends interference information in the acknowledgment information slot when the data packet is not received correctly by the secondary earphone; and wherein the audio source is used to send a data packet, continue to send new data packets when receiving acknowledgment information, and resend the data packet when the acknowledgment information is not received.

10. The TWS earphones communication system according to claim 9, wherein the audio source comprises one or more of a smart phone, smart speaker, IPAD, and personal computer.

* * * * *